United States Patent [19]

Buckles et al.

[11] Patent Number: 5,532,664
[45] Date of Patent: Jul. 2, 1996

[54] MODULAR SUPERCONDUCTING ENERGY STORAGE DEVICE

[75] Inventors: Warren E. Buckles, Madison, Wis.; Richard A. Lundy, White Salmon, Wash.

[73] Assignee: Superconductivy, Inc., Middleton, Wis.

[21] Appl. No.: 381,309

[22] Filed: Jul. 18, 1989

[51] Int. Cl.[6] .................................................. H01F 7/22
[52] U.S. Cl. ...................... 335/216; 335/299; 336/DIG. 1; 174/125.1
[58] Field of Search ......................... 335/216, 299; 336/DIG. 1; 174/125.1; 242/7.07, 7.11

[56] References Cited

U.S. PATENT DOCUMENTS

| | | | |
|---|---|---|---|
| 3,391,362 | 7/1968 | Albrecht et al. | 335/216 |
| 4,020,412 | 4/1977 | Rioux et al. | 323/43.5 R |
| 4,078,747 | 3/1978 | Minovitch | 244/159 |
| 4,122,512 | 10/1978 | Peterson et al. | 363/14 |
| 4,222,004 | 9/1980 | Abramiam | 323/44 F |
| 4,385,248 | 5/1983 | Laskaris | 310/52 |
| 4,486,676 | 12/1984 | Moore et al. | 310/52 |
| 4,493,014 | 1/1985 | Hagashino | 363/14 |
| 4,622,531 | 11/1986 | Eyssa et al. | 335/216 |
| 4,694,269 | 9/1987 | Burnett et al. | 335/216 |
| 4,694,868 | 9/1987 | Jahnke et al. | 140/92.1 |
| 4,695,932 | 9/1987 | Higashimo | 363/14 |
| 4,709,470 | 12/1987 | Meier | 29/605 |
| 4,814,731 | 3/1989 | Sato et al. | 335/216 |
| 4,816,709 | 3/1989 | Weldon | 310/178 |

*Primary Examiner*—George Harris
*Attorney, Agent, or Firm*—Neuman, Williams, Anderson & Olson

[57] ABSTRACT

A modular superconducting energy storage device includes a plurality of superconducting magnet modules joined in series in axial alignment. Each module comprises a core member having a superconducting coil member wound around it and a tensioning member that retains tension in the superconductor. The ends of the superconducting magnet are adapted for connection to a current source or to the free ends of the superconducting cable of an adjacent module as required. Each module is adapted for attachment to an adjacent module for retension in axial alignment. The attachment of additional modules increases energy storage capacity accordingly.

27 Claims, 3 Drawing Sheets

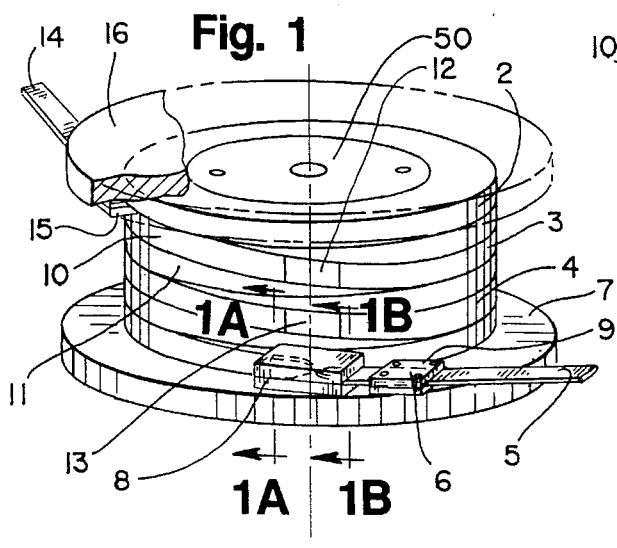
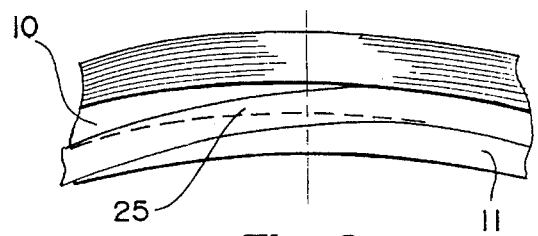
Fig. 3
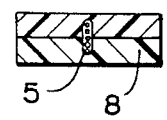
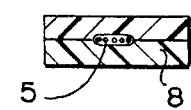
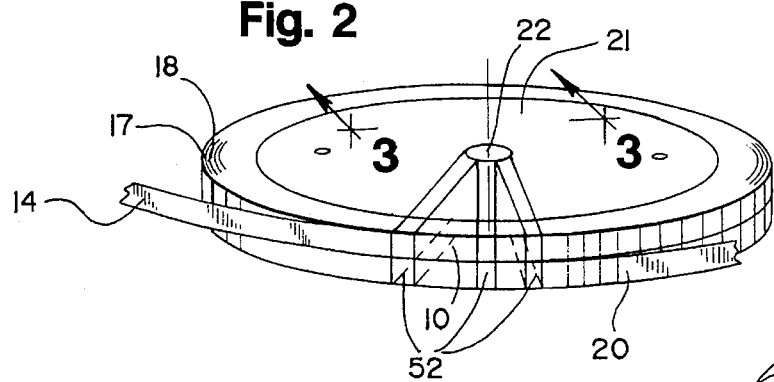
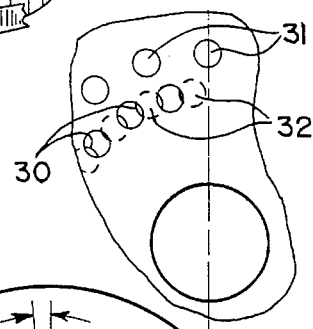
Fig. 6
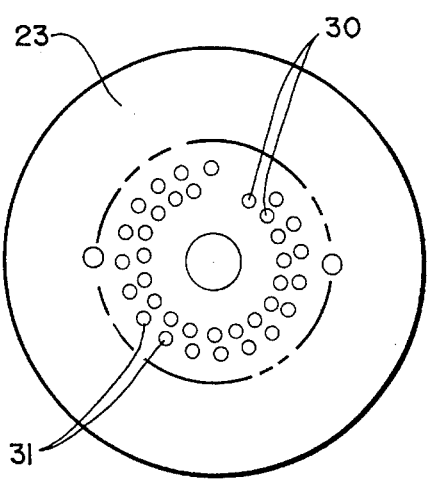
Fig. 4
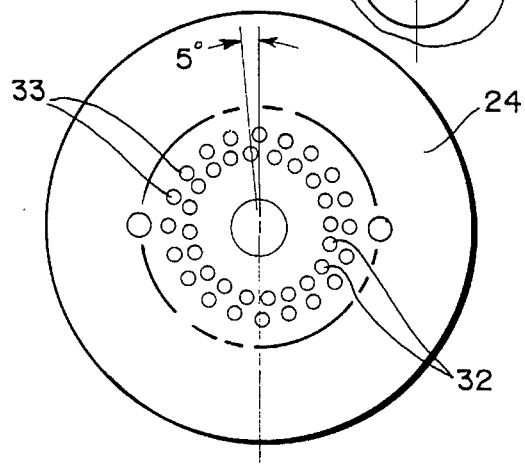
Fig. 5

Fig. 7
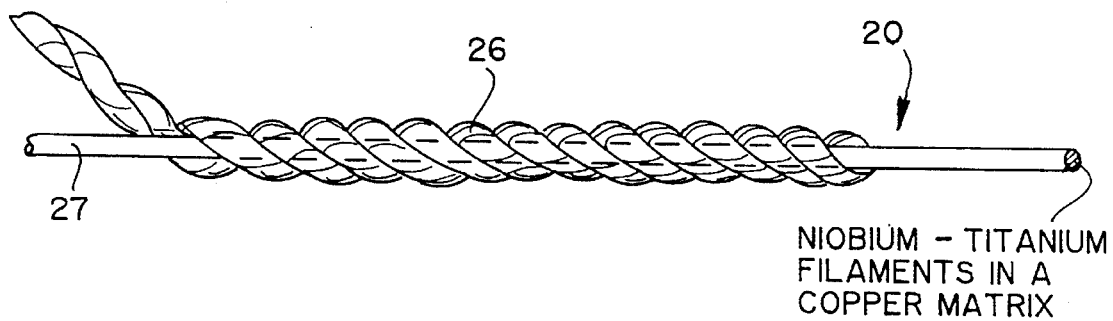
NIOBIUM – TITANIUM FILAMENTS IN A COPPER MATRIX
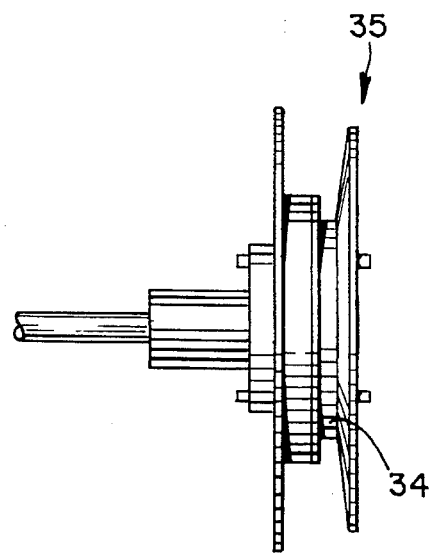
Fig. 8
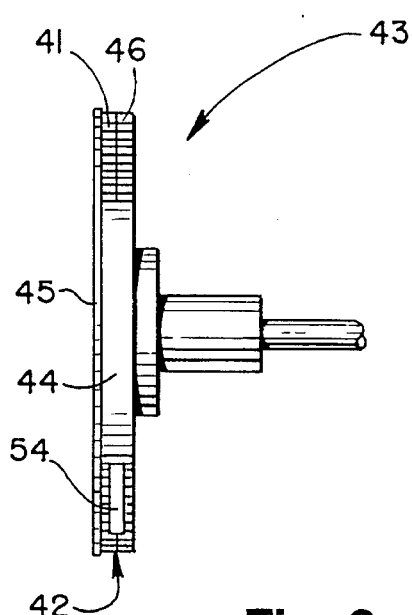
Fig. 9

MODULAR SUPERCONDUCTING ENERGY STORAGE DEVICE

BACKGROUND OF THE INVENTION

1. Field of the Invention

The invention relates to the use of superconducting magnets in energy storage systems. More particularly, the invention relates to the use of a modular superconducting magnet design to provide a simple and effective energy storage device having a capacity that can be upgraded by the addition of supplemental superconducting magnet modules.

2. Description of the Prior Art

Superconducting magnets were first developed to provide extremely large magnetic fields for use primarily in large scale particle accelerators. Superconducting magnets are also known to have application in the storage of substantial amounts of energy for prolonged periods of time. Although the benefits of using superconducting magnets in such applications are well known, and several systems have even been suggested that would utilize these benefits, many difficulties are still encountered that diminish the advantages of using superconducting magnets in commercial applications. One application for which such magnets might otherwise be of substantial benefit is in smoothing out variations in electricity demand over a twenty-four hour period. See, for example, Application Ser. No. 385,104, now U.S. Pat. No. 4,962,345, entitled "Superconducting Voltage Stabilizer" filed concurrently herewith.

The difficulties encountered with conventional superconducting magnets result to some extent from the design of these superconducting magnets and the techniques and materials consequently adopted for their manufacture. Typically, a superconducting magnet is wound in a manner similar to a spool of thread, from a single length of superconducting cable. The windings form a solenoid having several layers, with adjacent turns in each layer being disposed in axial alignment.

The magnetic fields produced by the adjacent loops of a solenoid add to give a field parallel to its axis. To maximize the magnetic field, it is important to ensure that current flows around the loops of the solenoid rather than parallel to its axis. The windings of the coil must therefore be insulated one from another.

The energy stored in any solenoid is proportional to the square of the magnetic field produced. In the case of a uniform field the stored energy is:

$$E = \frac{B^2}{2\mu_o}$$

where

E is energy in joules;

B is magnetic field in Tesla; and $\mu_o$ is the magnetic permeability of free space.

Thus, to maximize the amount of stored energy for a given current, the magnetic field produced by that current must also be maximized. To achieve this, the conductors must either be placed as closely together as possible or a core material of high magnetic permeability should be used, preferably, a combination of both.

Solenoids and other wound devices are inductive, however, and when subjected to a varying current, a voltage opposing the change in current is induced. The magnitude of the voltage obeys the following relation:

$V_L = L \times dI/dt$

Where $V_L$ is the back voltage across the inductor;

L is the characteristic inductance of the device; and dI/dt is the instantaneous change in current through the device.

Devices with large inductances, or that experience large variations in current, will therefore experience high back voltages. In the case of large superconducting magnets wound like a spool of thread, the induced voltage between adjacent conductors may be extremely high. As the ability of an insulator to withstand voltage is directly related to its thickness, the insulation around the coil windings in such large solenoids must be very thick. This thick insulation increases the distance between adjacent windings and correspondingly reduces the coupling effect between them. As it is vital that the insulation around the superconducting cables does not break down when subjected to large changes in current, high power superconducting magnets tend to be larger, have more turns, and be less efficient than a simple extrapolation of a smaller superconducting magnet would predict.

It would be desirable, therefore, to provide a superconducting magnet in which coupling between adjacent conductors is strong in order to create a more efficient energy storage unit.

The manufacture of large superconducting magnets is complicated by the tendency for conventional magnets to be wound from a single length of superconducting cable regardless of its capacity. Long lengths of superconducting cable of the necessary quality can be difficult to obtain and are inclined to be expensive. Waste of superconducting cable often occurs because there is insufficient length to wind the entire magnet, or because damage occurs to the cable during winding. This can add considerably to the cost of manufacturing the magnets further deterring their commercial utilization. It would be desirable, therefore, to provide a superconducting magnet that substantially reduces the wastage of superconducting cable in the manufacture of a large capacity magnet, and to thereby provide a lower cost alternative to conventional superconducting magnets.

Conventional superconducting magnets additionally tend to be inflexible in their storage capacity. As the length of the conductor determines the capacity of the magnet, the only practical way to increase the capacity of a storage system is to replace the existing superconducting magnet with one that is entirely new and larger. In applications where the storage capacity of a system may desirably be upgraded on a relatively frequent basis, the utilization of a conventional superconducting magnet as a storage unit is not an attractive option. It would therefore be advantageous to provide a superconducting magnet that could be upgraded without requiring an entirely new magnet to be wound and substituted for the existing magnet.

Another factor that influences the cost and therefore the commercial viability of a superconducting magnet is the probability that the final product will be of adequate quality. For all wound magnets, the only way the quality of the magnet can be verified is by inspecting the parts prior to winding, and testing the magnet afterward. Any damage in the interim is difficult if not impossible to detect. As winding a large conventional superconducting magnet is likely to take a significant length of time, it would be useful to provide a large capacity magnet for which the time taken in winding a defective coil is reduced, enabling manufacturing costs to be correspondingly decreased.

It would be desirable, therefore, to provide a superconducting magnet that has adequate storage capacity and can easily be upgraded to meet increased storage requirements. It would also be desirable for the magnet to be designed such that wastage of both material and manufacturing time is reduced. The provision of such a superconducting magnet would greatly enhance the commercial appeal of superconducting magnets as energy storage units.

The modular design of the present invention provides such a superconducting magnet. The magnet is built from modular units connected in series to provide the desired storage capacity. This arrangement enables additional units to be added to upgrade the magnet's capacity as desired, and in addition, as each individual unit is smaller than the final magnet, problems associated with scale are avoided. Quality assurance is also enhanced because individual units can be verified prior to assembly, and only those units found satisfactory joined to form large modular superconductors.

OBJECTS OF THE INVENTION

Accordingly it is an object of this invention to provide an improved superconducting magnet suitable for energy storage that meets the aforementioned needs.

It is a specific object of this invention to provide a superconducting magnet that has a high energy storage capacity and yet avoids some of the problems encountered with large conventional superconducting coils.

It is a further object of this invention to provide a superconducting magnet that is of greater utility for commercial energy storage applications.

It is another object of this invention to provide a superconducting magnet suitable for energy storage that facilitates upgrading to higher storage capacity.

It is yet another object of this invention to provide a superconducting magnet that can be manufactured with reduced wastage of resources.

SUMMARY OF THE INVENTION

In accordance with one embodiment of this invention, a modular superconducting magnet which achieves the foregoing objects includes a plurality of superconducting magnet modules joined in series in axial alignment. Each module comprises a core member having a superconducting coil member wound around it and a tensioning member adapted to retain the tension in the superconductor. The ends of the superconducting magnet are adapted for connection to a current source or to the free ends of the superconducting cable of an adjacent module as required. Each module is adapted for attachment to an adjacent module for retention in axial alignment.

The superconducting coil member may take the form of two axially aligned coils wound from a single length of superconducting cable. The cable may be of substantially rectangular cross-section and the core member may be disc-shaped. To ensure that the free ends of the coil member are accessible for connection to the free ends of another module, the transition turn between the two coils of the superconducting coil member may form part of the inner turn of each of the two coils.

Adjacent modules may be connected to form the modular superconducting magnet by splicing the output end of one of the modules to the input end of the other. The splice must then be sufficiently strong to withstand the tension in the windings.

BRIEF DESCRIPTION OF THE DRAWINGS

For a more complete understanding of this invention, reference should now be made to the embodiment illustrated in greater detail in the accompanying drawings and described by way of example only. In the drawings:

FIG. 1 is a schematic perspective view of a modular superconducting magnet assembled from individually wound "double pancake" units or modules;

FIG. 1A is a section through the guide shown in FIG. 1 at a point close to the magnet showing the cable in vertical position within the guide.

FIG. 1B is a section through the guide shown in FIG. 1 at a point close to the block showing the cable in horizontal position within the guide.

FIG. 2 is a perspective view of an individual double pancake unit that forms part of the magnet assembly of FIG. 1;

FIG. 3 is a partial view of the double pancake unit of FIG. 2 with the inner former removed showing the transition turn that forms part of the inner turn of each coil of the double pancake unit of FIG. 2;

FIG. 4 is a top elevation of the first type of inner former used as the core for modules of the superconducting magnet of FIG. 1.

FIG. 5 is a top elevation of the second type of inner former used as the core for modules of the superconducting magnet of FIG. 1.

FIG. 6 is a top elevation of a section of the inner former of FIG. 4 superimposed upon the inner former of FIG. 5 showing the alignment of the two types of hole pattern.

FIG. 7 is a schematic view of the superconducting cable used to wind the double pancake units of FIG. 1.

FIG. 8 is section through the tensioning end of the winding apparatus used for winding the double pancake unit of FIG. 1 with a backwind former in position.

FIG. 9 is a section through the winding end of the apparatus of FIG. 7 showing both coils of a double pancake unit fully wound.

DETAILED DESCRIPTION OF THE DRAWINGS

Figure 10:
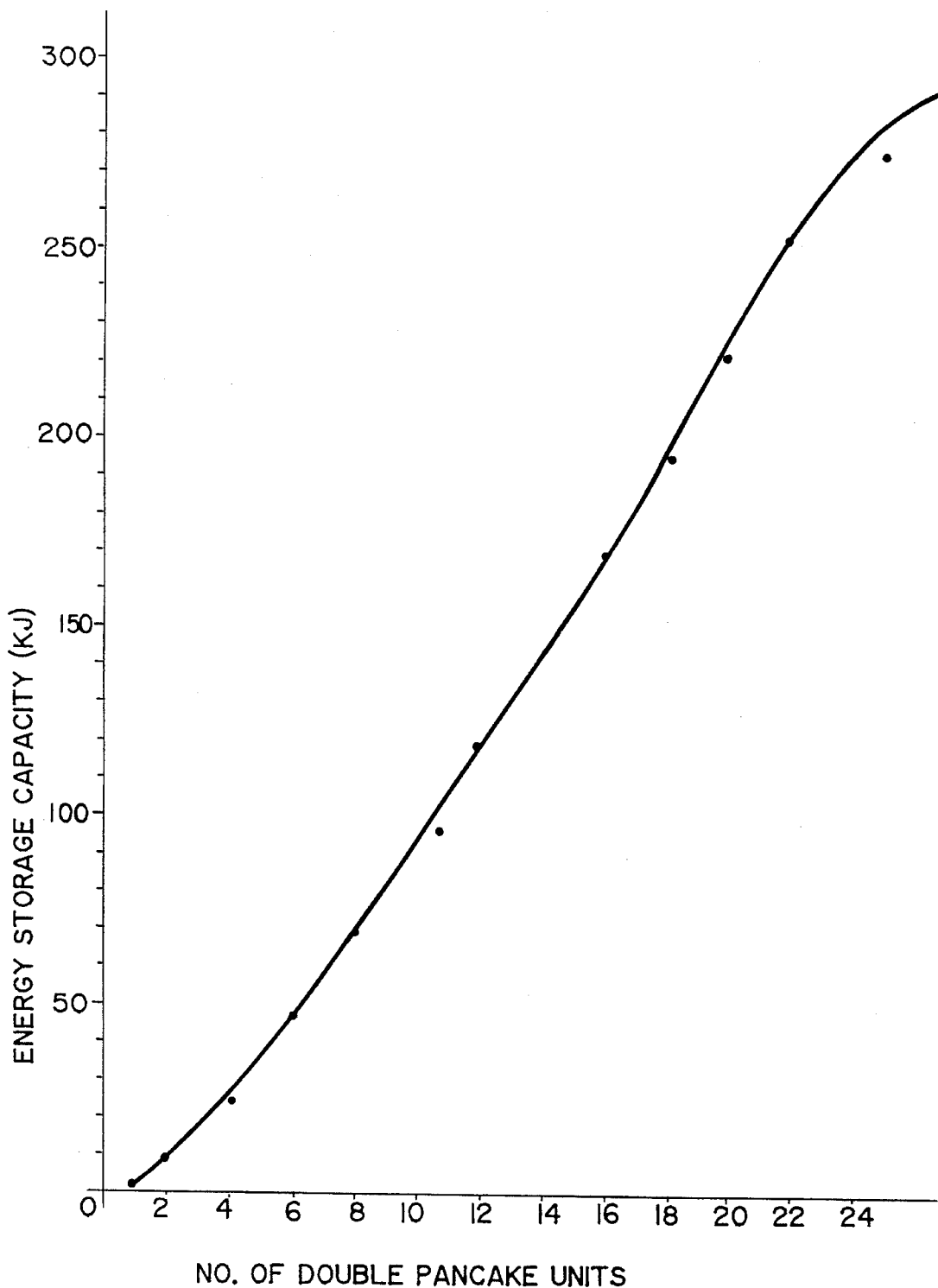
FIG. 10 is a graph plotting the energy storage capacity of a modular magnet against the number of double pancake units in the modular superconducting magnet.

Turning first to FIG. 1, a schematic view of a modular superconducting magnet 1, assembled from three double pancake units 2, 3, 4, one of which is illustrated in FIG. 2 as can be seen. Each individual double pancake unit or module is joined in series to adjacent double pancake units. The free end 5 of bottom double pancake unit 4 is clamped by block 6 bolted to the inner face of the lower tensioning flange 7 shown in partial section and in operation is connected to a current source. The cable is twisted through 90° by guide 8 seen in section in FIGS. 1A and 1B. The guide 8 directs the cable in position for clamping by block 6 without risking damage to the cable. Bolts 9 are tightened to the clamp the block 6 to retain the cable in the block and hold tension in the cable.

The current flows in the same manner around each of coils 10, 11 of double pancake 2 and on to second double pancake unit 3. Second double pancake unit 3 is spliced to first double pancake unit 2 at splice 12. Third pancake unit 4 is similarly joined to second pancake unit 3 by splice 13. The free end 14 of top pancake unit 4 is clamped by block 15 on upper tensioning flange 16. When the superconducting magnet forms part of a current supplying circuit, current will flow through the entire modular unit 1 and a magnetic field will be induced by each individual double pancake that will provide a field along the axis of the superconducting module.

One of the individual pancake units 2 that form the modular magnet of FIG. 1 can be seen more clearly in FIG. 2. Double pancake unit 2 is shown as being wound from a single length of superconducting cable 20 of substantially rectangular cross-section. Coils 10, 11 are wound on an inner former 21 that has a central hole 22 and is of circular geometry although other geometries could equally well be utilized. The inner former 21 typically has a diameter on the order of 6 inches, but formers having other diameters could work equally well. The relatively small size of the former used in this embodiment provides for adequate storage capacity and facilitates manipulation.

Coils 10, 11 are wound so that adjacent turns such as those indicated 17 and 18 are in radially adjacent disposition and axially adjacent turns are subject to a maximum conductor-conductor voltage of:

$V_{max} = \frac{1}{2} V_{coil}/N$ where:

$V_{coil}$ is the discharge or charge voltage of the entire coil made up of a number of modules; and N is the total number of modules in the coil.

The incremental inductance between adjacent turns of the pancake units of the assembly of this invention is low compared to that of a layered solenoid magnet wound like a spool of thread. The amount of insulation required between turns is correspondingly diminished as a consequence. Adjacent conductors can be disposed in close relation so that coupling between the conductors is not adversely effected. This enables magnets of the design of this embodiment to be smaller for a given storage capacity than layered solenoid of conventional design.

The current flowing in each of coils 10, 11 does so in the same sense and there is a transition turn 25 (seen most clearly in FIG. 3) that forms part of the inner turn of both coils 10, 11.

FIGS. 4 and 5 show the alternative arrangements of the rings of tensioning holes on the first type of inner former 23, and the second type of inner former 24. The holes on each ring are situated at eighteen degree intervals around the former. The hole formation of inner former 24 is similar to that of inner former 23 with the holes of each ring 32, 33 being off set by five degrees from their counterparts, rings 30 and 31, on inner former 123 as can be seen in FIG. 6. FIG. 6 shows the two formers in vertically adjacent disposition. These hole formations are used in tensioning the splices between adjacent double pancake units described later.

Each double pancake unit 2, 3, 4 is wound in a similar manner from a length of superconducting cable. Cable 20 used for this embodiment of the invention is of rectangular cross-section made from a series of conductors placed in adjacent relation, but other cross-sectional geometries of the conductor could be utilized, For improved tensioning, cable 20 may include a knitted or woven covering 26 that sheaths conducting wire 27 that may be niobium-titanium filaments in a high-purity copper matrix, sometimes referred to as a niobium-titanium/copper filamentary composite, or another superconducting material and can be seen in FIG. 7. Covering 26 can be formed from non-electrically conductive material such as KEVLAR, fiberglass or other suitable filamentary composites. The sheath wraps around the cable in such a way as to tighten around the cable as tension is applied to the free end and create tension in the conductor.

Although the pancake units illustrated in this embodiment comprise two adjacent coils, pancake units having three or more adjacent coils could be utilized in the same manner to form a modular superconducting magnet.

Before initiating winding, a length of superconducting cable of suitable length must be selected. The length is predetermined to ensure that it is sufficient to wind a complete double pancake unit. The required length of cable, typically 50 feet, is wound onto a storage forewind former. The forewind former (not shown in FIG. 9) is bolted, along with an inner former 44 and a tensioning flange 45, to winding end 43 of the winding machine illustrated in FIG. 9. The end of the length of cable is then attached to a storage backwind former 34, shown in FIG. 8, bolted on the tensioning end 35 of the machine. Tensioning end 35 maintains tension in the cable as it is wound into a coil on winding end 43. Both ends of the length of cable are connected to the storage formers by 6 foot metal strips that act as lead material. The cable is wound from the forewind former onto backwind former 34 until the mid-point of the cable is determined and marked.

First coil 41 of double pancake unit 42 (shown fully wound in FIG. 9) on winding end 43 of the machine is then wound onto inner former 44, starting with the mid-point of the length of cable and ending with the end of the cable which is temporarily stored on backwind former 34 located on tensioning end 35 of the apparatus. First coil 41 has on order 11 turns and is temporarily held in tension by clamping the cable end in the tensioning flange 45 that rotates with inner former 44. The clamp is maintained until the second coil 46 has been wound and the tension of the entire unit has been secured. The first half of the length of cable, which is stored on the forewind former next to inner former 44 is removed from winding end 35 of winding machine, and placed on tensioning end 43 in place of backwind former 34 which is now empty.

The winding and tensioning motors of the winding machine are then reversed since the windings of the second coil will be created by rotating the winding end 43 in the opposite direction to that used to wind first coil 41 in order to ensure that the windings of both coils are in the same direction and that the current flows in the same direction around both coils. This is important because if the coils were wound such that current flowed in opposite directions around the two coils, the magnetic fields produced by the two halves would cancel and the storage capacity of the magnet would be effectively zero.

The midpoint of the cable makes up the transition turn 25 that forms the innermost turn of both the first and second coils 41, 46. As the transition turn crosses from the first to the second coil a transition turn spacer may be positioned in each coil in order to encourage the beginning of the second winding to follow smoothly from the transition turn without pinching or damaging the insulated conductor.

A second coil 46 that also has an order of eleven turns is then wound. Once the winding of second coil 46 is completed, the winding motor is stopped while the tensioning motor stays running to maintain the tension in the second coil. Double pancake unit 42 is then clamped with adhesive backed insulating tape available commercially under the tradename KAPTON. The unit is then taped both radially and laterally to hold the windings secure. The tape also maintains tension in the wires. Once the tension in the windings has been secured by the KAPTON tape, the end of the superconducting cable is removed from the tensioning flange of the winding machine and the entire unit is then removed. Three layers of adhesive backed insulating tape wound around the outer winding of a double pancake unit has been found to be sufficient to hold the required tension in the turns of the coil for storage purposes.

Once a series of double pancake units have been wound in the manner described above, the procedure of joining individual units, one having the first type of inner former 23 and the other having the second type of inner former 24, to create a larger modular superconducting magnet can begin. The technique adopted for joining one unit to another involves first aligning two pancake units by passing a rod through the central hole 22 in each unit. The output of one of the units is then spliced to the input of another so that when in operation a current will flow through both the pancake units in the same manner such that each unit produces a magnetic field in the same direction.

The process begins by removing the insulating material from five inches at the end of each cable to be joined. The insulating material may be removed by using cleaning acid and an abrasive pad. The corrosive cleaning material is subsequently removed using an aerosol spray. Once the insulating covering has been removed, the cable is tinned. Rosin flux is applied and the cable ends are wetted with solder. The tinned cable is then thoroughly cleaned using flux remover. The cable ends are then in condition for splicing.

A closed cavity fixture is used to splice the ends together, The closed cavity forms the splice at a radius equal to that of the outer turn of the double pancake unit. The tinned cable ends are fluxed and placed in the cavity such that they have a four inch overlap. A flattened solder strip is placed between the cable ends. The fixture is tightly clamped and heated. When the solder flows at a temperature of about 325 degrees, the fixture is reclamped and cooled. The splice is then cleaned with flux remover and insulated with adhesive backed KAPTON tape.

Once two pancake units are spliced together, tension must be created in the splice. This tensioning is accomplished by rotating the upper unit relative to the lower unit about the central rod. A calibrated tensioning tool is used to rotate the upper unit. When the tensioning tool indicates that the desired splice tension has been reached, a ¼ inch stainless steel dowel pin is inserted into a hole in either the inner or outer ring of holes in the upper former that coincides with a hole in the lower former. With the arrangements depicted in FIGS. 4 and 5, alignment of two holes should occur once every ½ degree of relative rotation, thereby enabling a precise tension to be maintained.

A lower tensioning flange 7 (FIG. 1) is placed adjacent the module that is to form one extremity of the superconducting magnet. Lower flange 7 has the opposite hole pattern to the inner former of end module 4 to which it is attached. Free end 5 of the superconducting cable of the end module 4, clamped by block 6 on flange 7, is tensioned by rotating flange 7 relative to the end module to tension the cable. A pin is inserted through the aligned holes of the flange and adjacent inner former to secure the desired tension in the cable.

A third and other subsequent pancakes can be added as required to the multiple pancake superconducting magnet formed in this manner described above, adjacent pancakes being wound on formers having opposite hole patterns to enable tensioning to be achieved at each splice. By adding further pancake units to an existing modular magnet, the capacity of the magnet can be upgraded as desired. Once the last double pancake unit has been added to the modular coil, an upper flange 16 is placed adjacent the final unit, as shown in FIG. 1. Free end 14 of the cable of uppermost pancake unit 2 is clamped to upper flange 16 and the cable is then tensioned and secured in the same manner as described for lower flange 7. The entire magnet is then wrapped in KEVLAR string. Several hundred turns of the string under tension are wrapped around the module to ensure that tension in the assembly is maintained.

As the design of the pancake units is such that the conductors effectively transfer forces from one conductor to another, less restraint is required to prevent the turns of the coils moving one relative to another. Friction between adjacent turns is sufficient to retain tension in the inner turns and the tape wound around the exterior maintains tension in the outer turns. The particular design of the pancake also therefore diminishes the chance of a "quench" condition propagating throughout the assembly.

Upper and lower flanges 7, 16 are secured by six one-inch threaded bolts situated in holes equally spaced around the coil diameter. A predetermined axial load can then be placed on the assembly with the aid of a hydraulic press and belleville-type washers. At this stage the modular superconducting magnet is in condition for operation. Electrical connections are formed to supply current to the coil, and the entire assembly is mounted on the underside of the lid of a cryostat.

During operation, the entire magnet arrangement is placed in a cryostat to be maintained at temperatures in the region of 4K in order that the current carrying cable, for example, niobium-titanium alloy cable, exhibits superconducting properties. In operation, magnet cable will typically handle a current of 5000 amperes and will typically stores 2.12 kilojoules or 0.59 watt hours of energy in each double pancake unit.

The modular design of the superconducting magnet described herein offers unique advantages over large scale superconducting magnets wound as a single unit. It also offers manufacturing economy in a variety of ways. The modular arrangement enables magnets having different energy storage capacities to be built from a series of similar modules. Thus, the development costs of the system can be spread over a larger potential market for the magnets; only one set of techniques and tools needs to be developed to produce magnets varying widely in their storage capacities; and modules can be made in advance and stocked for later sale and use. In contrast, superconducting magnets that are wound to meet specific requirements can only be manufactured on request, inevitably introducing long delays in delivery.

The advantages noted above should enable modular superconducting magnets to be economically manufactured and thus enable their utilization by companies that must consider the benefit of the system in relation to its cost.

The addition of successive double pancake units will increase the energy storage capacity in a non-linear manner, as illustrated in FIG. 10.

The modular arrangement additionally provides for greater quality assurance in the magnet. As the magnets are wound in individual modules each unit can be tested prior to assembly into a larger modular magnet. If at this stage any of the modules are found to be defective, they can be readily replaced with other modules that are found to function correctly, preventing the formation of a large, partially defective magnet that will then need to be rewound with all the resultant expenditure.

A further advantage with the modular arrangement occurs as a result of the present design. Rather than winding an entire superconducting magnet from a single length of conductor, a magnet having the same storage capacity can be wound using a number of shorter lengths of cable. Because, as previously discussed, long lengths of operational superconducting cable are likely to be expensive, this aspect of the present design enables a modular magnet to be produced more economically than an integral coil of a similar capacity. The modular arrangement therefore reduces waste of superconducting cable.

The modular arrangement also provides the user of the system with the option of increasing its capacity as and when desired by the addition of one or more pancake units to those already in position. Because energy stored is proportional to the square of the magnetic field, as discussed earlier, by doubling the number of power units the energy storage capacity is increased fourfold. The capacity of the magnet therefore increases faster than the number of additional units added.

While one preferred embodiment of this invention is illustrated, it will be understood, of course, that the invention is not limited to this embodiment. Those skilled in the art to which the invention pertains may make modifications and other embodiments employing the principles of the invention, particularly upon considering the foregoing teachings.

What is claimed is:

1. A superconducting magnet for energy storage comprising a plurality of modules connected in series such that in operation the magnetic field produced by each of said modules acts in the same direction, each module comprising:

a core member;

a superconducting coil member wound around said core member, said coil member having an input end and an output end;

a tensioning member adapted to retain the tension in the turns of said coil member; and attachment means adapted to secure said unit to another of said units;

said input and output ends being adapted for attachment to another of said modules.

2. The magnet of claim 1 wherein said core member comprises material of high magnetic permeability.

3. The magnet of claim 1 wherein said superconducting coil member comprises two axially aligned windings wound from a single length of superconducting cable.

4. The magnet of claim 3 wherein said cable is of substantially rectangular cross-section and successive turns of said windings are radially adjacent.

5. The magnet of claim 4 wherein said cable comprises a series of adjacent superconducting wire members.

6. The magnet of claim 4 wherein said cable comprises niobium-titanium filaments in a copper matrix.

7. The magnet of claim 4 wherein said core member is disc-shaped.

8. The magnet of claim 7 wherein said tensioning member comprises upper and lower tensioning flanges having adjustable restraining means attached to the inner face of each of said flanges to respectively clamp the free ends of said superconducting member of the outermost modules, said tensioning flanges being independently rotatable about the axis of the coil member to enable the tension in said superconducting member to be set at the desired level.

9. The magnet of claim 8 wherein said tensioning member further comprises a length of insulating tape wound around the outermost turn of each of said modules.

10. The magnet of claim 4 wherein a transition turn between said two windings forms part of the inner turn of each of said windings.

11. The magnet of claim 1 wherein the output end of the superconductor of one said module is connected in series to the input end of the superconductor of another said module by a splicing technique.

12. The magnet of claim 11 wherein said splice is tensioned by rotating said one said module relative to said other said module.

13. The magnet of claim 11 wherein the method of splicing the ends of adjacent modules comprises the steps:

cleaning the insulating material from the ends of said superconductors;

tinning the ends with flux;

thoroughly cleaning the tinned ends of the superconductor;

overlapping the ends and placing them in adjacent relation;

placing a flattened solder strip between the cable ends;

clamping the ends and the solder strip together and heating until the solder flows;

reclamping said ends and cooling said splice;

cleaning said splice; and insulating said splice with an insulating tape.

14. A method of winding a superconducting magnet module that comprises a core member, a pair of superconducting coils wound around said core member axially aligned and wound from a continuous superconducting cable, said superconducting cable having a substantially rectangular cross-section, said pair of coils having an input end and an output end, a tensioning member adapted to retain the tension in the turns of said pair of coils, and attachment means adapted to secure said unit to another of said units, comprising the steps:

cutting a length of superconducting cable sufficient to wind the pair of coils;

determining a specified point on said length of cable;

marking said specified point;

taking said specified point on said cable to form part of an innermost turn and winding under tension part of said length of cable defined by said mark and one end of the cable, to form the first of said pair of coils on said core member such that adjacent turns are situated in radially adjacent relation;

further tensioning said first coil;

taking said unwound portion of said cable;

winding the second of said pair of coils, around said core member adjacent said first coil, by taking the unwound portion of said cable adjacent said mark to form part of the innermost turn of said second coil and under tension winding said second coil in a manner similar to the winding of said first coil such that the fields produced by said first and second during operation act in the same direction;

further tensioning said second coil;

securing the tension of said first and second coils such that the ends of the cable are free for subsequent attachment.

15. The method of claim 14 wherein said specified point is the mid-point of said length of cable.

16. The method of claim 14 wherein said tensioning member comprises upper and lower tensioning flanges having adjustable restraining means attached to the inner face of each of said flanges to respectively clamp the input and output ends of said superconducting member, said tensioning flanges being independently rotatable about the axis of the coil such that tensioning is achieved by rotating said upper flange relative to said lower flange.

17. The method of claim 16 wherein the securing of the tension in said first and second coils is accomplished by winding insulating tape around the outermost turn of each coil.

18. The method of claim 14 further comprising:

cleaning the insulating material from the output cable end of said first module and the input cable end of said second module;

tinning each of said cleaned ends with flux;

thoroughly cleaning said tinned ends of said cables;

overlapping the output and input ends of said cables and placing them in adjacent relation;

placing a flattened solder strip between said pair of cable ends;

clamping said cable ends and said solder strip together and heating until said solder flows;

reclamping said cable ends and cooling said splice;

cleaning said splice; and insulating said splice with insulating tape;

tensioning said splice by rotating said first module relative to said second module;

whereby a modular superconducting magnet comprising two modules connected in series, such that the magnetic field produced by each of said modules acts in the same direction is formed.

19. The method of claim 18 further comprising the step of attaching at least one additional module to said modular superconducting magnet in the same manner as said second module is attached to said first module to achieve a modular superconducting magnet of predetermined capacity.

20. A superconducting coil magnet unit suitable for attachment to other similar units to provide a modular superconducting magnetic coil comprising:

a core member;

a superconducting coil member wound around said core member said coil having an input end and an output end, said superconducting member including two windings axially aligned and wound from a continuous superconducting cable, said superconducting cable having a substantially rectangular cross-section and successive turns of each coil being radially adjacent;

insulating means to insulate individual superconducting cables one from another;

a tensioning member adapted to retain the tension in the turns of each of said coils; and attachment means adapted to secure said unit to another of said units;

said input and output ends being adapted for attachment to the input and output ends of another unit similar to said magnet unit.

21. The unit of claim 20 wherein the core member comprises a material of high magnetic permeability.

22. The unit of claim 20 wherein a transition turn between said two windings forms part of the inner turn of each of said coils.

23. The unit of claim 20 wherein said core member is disc-shaped.

24. The unit of claim 20 wherein said superconducting cable comprises niobium-titanium filaments in a copper matrix.

25. The magnet of claim 23 wherein said tensioning member comprises upper and lower tensioning flanges having adjustable restraining means attached to the inner face of each of said flanges to respectively clamp the input and output ends of said superconducting member said tensioning flanges being independently rotatable about the axis of the cord such that tensioning is achieved by rotating said upper flange relative to said lower flange.

26. The unit of claim 25 wherein said tensioning member further comprises a length of insulating tape wound around the outermost turn of each of said two coils.

27. The unit of claim 20 wherein the superconducting cable comprises superconducting wire, a woven sheath of non-electrically conductive material, said sheath covering said wire such that tension applied to said cable causes said sheath to tighten on said wire, such that tension is maintained in said coil turns.

* * * * *